US005379468A

United States Patent [19]

Cassidy et al.

[11] Patent Number: 5,379,468

[45] Date of Patent: Jan. 10, 1995

[54] PATIENT-HANDLING APPARATUS

[76] Inventors: Joseph P. Cassidy, 612 Central Ave., Lafayette, Ind. 47905-1864; James L. Meyer; David J. Meyer, both of 1889 180th Ave., Lost Nation, Iowa 52254

[21] Appl. No.: 52,462

[22] Filed: Apr. 26, 1993

[51] Int. Cl.[6] .......................... A61G 7/10; A61G 7/14

[52] U.S. Cl. .......................................... 5/86.1; 5/81.1; 5/83.1; 280/304.1

[58] Field of Search .................................. 5/81.1-89.1; 280/304.1; 414/921

[56] References Cited

U.S. PATENT DOCUMENTS

| | | | |
|---|---|---|---|
| 953,962 | 4/1910 | Lane . | |
| 1,804,299 | 5/1931 | Yentsch . | |
| 2,272,778 | 2/1942 | Reuter . | |
| 2,339,007 | 1/1944 | Gahm | 5/81.1 |
| 2,663,031 | 12/1953 | Kalthoff . | |
| 2,914,110 | 11/1959 | Schulte | 5/81.1 |
| 3,063,736 | 11/1962 | Landig . | |
| 3,203,009 | 8/1965 | Lundberg | 5/81.1 |
| 3,205,512 | 9/1965 | Camper . | |
| 3,407,413 | 10/1968 | James | 5/81.1 |
| 3,623,169 | 11/1971 | James | 5/81.1 |
| 3,638,647 | 2/1972 | Creelman | 297/385 |
| 3,694,829 | 10/1972 | Bakker | 5/81.1 |
| 3,711,877 | 1/1973 | Averill | 5/81.1 |
| 3,758,894 | 9/1973 | Finley | 5/81.1 |
| 3,852,835 | 12/1974 | Whitaker | 5/87.1 |
| 3,877,421 | 4/1975 | Brown | 5/81.1 |
| 4,070,721 | 1/1978 | Stasko | 5/86.1 |
| 4,141,094 | 2/1979 | Ferguson et al. | 5/81.1 |
| 4,144,713 | 3/1979 | Clark et al. | 5/81.1 |
| 4,288,124 | 9/1981 | Hamilton | 5/81.1 |
| 4,409,696 | 10/1983 | Bakker | 5/81.1 |
| 4,530,122 | 7/1985 | Sanders et al. | 5/81.1 |
| 4,606,082 | 8/1986 | Kuhlman | 5/81.1 |
| 4,739,526 | 4/1988 | Hollick | 5/81.1 |
| 4,761,842 | 8/1988 | Weiner | 5/81.1 |
| 4,999,862 | 3/1991 | Hefty | 5/81.1 |
| 5,185,895 | 2/1993 | Gagne et al. | 5/86.1 |
| 5,201,084 | 4/1993 | Johnson | 5/81.1 |

*Primary Examiner*—Alexander Grosz
*Attorney, Agent, or Firm*—Barnes & Thornburg

[57] ABSTRACT

A patient-handling apparatus includes an upright post having a top end and a support arm having an inner end adjacent to the upright post and an outer end away from the upright post. The support arm is coupled to the top end of the post about a pivot point to permit movement of the support arm relative to the post between a cantilevered position at an angle to the post and a stored position alongside the post and to permit movement of the support arm relative to the pivot point during movement of the support arm between the cantilevered and stored positions. A mechanism is provided for suspending a patient in the air from the support arm following movement of the support arm to its cantilevered position so that a patient can be moved from one place to another along the support arm between the inner and outer ends of the support arm.

28 Claims, 5 Drawing Sheets

PATIENT-HANDLING APPARATUS

BACKGROUND AND SUMMARY OF THE INVENTION

This invention relates to patient-handling apparatus, and particularly to apparatus for lifting limited mobility or invalid patients. More particularly, this invention relates to a patient-handling apparatus mounted on a wheelchair or other vehicle and configured to be integrated into a comprehensive patient transport system for helping non-ambulatory patients move between beds, chairs, and bathroom facilities at home or in a medical care facility.

Many disabled people, given the opportunity, would prefer to live at home with a spouse or other caregiver. Oftentimes this is not practical because of the inability of people with certain disabilities to move around, and in particular, to move back and forth between a wheelchair and a bed or couch. An aged spouse or caregiver is often frail and unable to give adequate or sustained assistance of the type needed to help the disabled person move about in the home. In some cases, the problems faced by sedentary people cannot be overcome and it becomes necessary to relocate such people to nursing homes or medical care facilities where nurses are present around the clock to help lift, support, transport, and otherwise move debilitated patients.

What is needed is an apparatus that can be used easily in either a home setting or a medical care facility by almost anyone to help move sedentary people from one position to another or from one place to another. Ideally, such an apparatus would be fully automated so that it could be controlled and operated by the person seeking increased mobility. In any case, the apparatus should be motorized and designed so that it can be operated by an aged or frail spouse or caregiver to move a patient in need from, for example, a supine position on a bed to a seated position in a chair alongside the bed and vice versa.

According to the present invention, a patient-handling apparatus includes an upright post, a support arm, and means for coupling the support arm to the upright post in a cantilevered position. The patient-handling apparatus further includes means for suspending a patient from the cantilevered support arm and moving the patient along the support arm from one place to another. By raising or lowering the post, it is possible to raise and lower the cantilevered support arm and therefore lift up or let down a patient held by the suspending means mounted on the cantilevered support arm.

In preferred embodiments, the upright post is mountable on a wheelchair to enhance the mobility of the patient-handling apparatus. The suspending means is well-suited for transferring a patient from an adjacent bed to the wheelchair. Advantageously, the coupling means is configured to pivot so as to make it easy for a user to collapse the support arm by moving the support arm from its horizontal cantilevered position above the wheelchair to a vertical stored position alongside the post.

In order to facilitate transfer of a patient from a bed to a seat facing toward one side of the bed, the suspending means is configured to turn a suspended patient about a vertical axis after the patient is lifted off of the bed and before the patient is lowered onto the seat. Ideally, the patient is wearing a comfortable, lightweight body harness or sling which is attached by a cable to the supporting means.

Illustratively, the patient-handling apparatus includes means for holding a patient under the support arm in a suspended position, means for moving the holding means along a path on the support arm toward and away from the post so that a patient held in the holding means is transportable along the support arm in a suspended position, and means for turning the holding means about a vertical axis to turn a suspended patient held in the holding means about the vertical axis. The moving means is operable to move a patient from one place to another without requiring a caregiver to lift the patient. The turning means is operable to turn a patient held in the holding means automatically either when the holding means is stationary or during movement of the holding means along the path on the support arm toward and away from the upright post.

In preferred embodiments, a hand-held control unit is provided to enable either the sedentary patient or a caregiver to operate the patient-handling apparatus by remote control. Illustratively, the various means for moving and turning the patient-holding means as well as means for pivoting the support arm between its cantilevered and stored positions are motorized. By using the handle-held control unit, it is possible for a patient to ride in a motorized wheelchair to a position alongside a bed and instruct the patient-handling apparatus to lift the patient off the wheelchair seat, turn the patient 90° about a vertical axis, move the patient from a position above the wheelchair seat to a position above the bed, and then lower the patient gently onto the underlying bed. Of course, this sequence can be reversed and varied using the hand-held control unit. Advantageously, a frail spouse or caregiver can also use the hand-held control unit to achieve the same results.

The patient-handling apparatus is well-suited for use at home or in a medical care facility. The collapsible nature of the support arm makes it easier to move the apparatus about in a home setting. It will be understood that this apparatus has widespread application including, for example, transferring patients into and out of bathtubs.

The patient-handling apparatus is compatible with an automated system for transporting patients from one place to another in a medical care facility with minimum staff intervention. It is expected that such a system will reduce health care costs. In such a system, each patient would be outfitted with a comfortable lightweight harness and could be moved from one place to another using a mobile patient-handling apparatus. IN some cases, programmed motorized wheel chairs and patient-handling apparatus could be used to transport a patient along a set path in accordance with a predetermined schedule, while in other cases, patients or caregivers could intervene using the hand-held control unit or the like to control the movement and arrival time of the patients at a destination in a medical care facility.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWING

Figure 1:
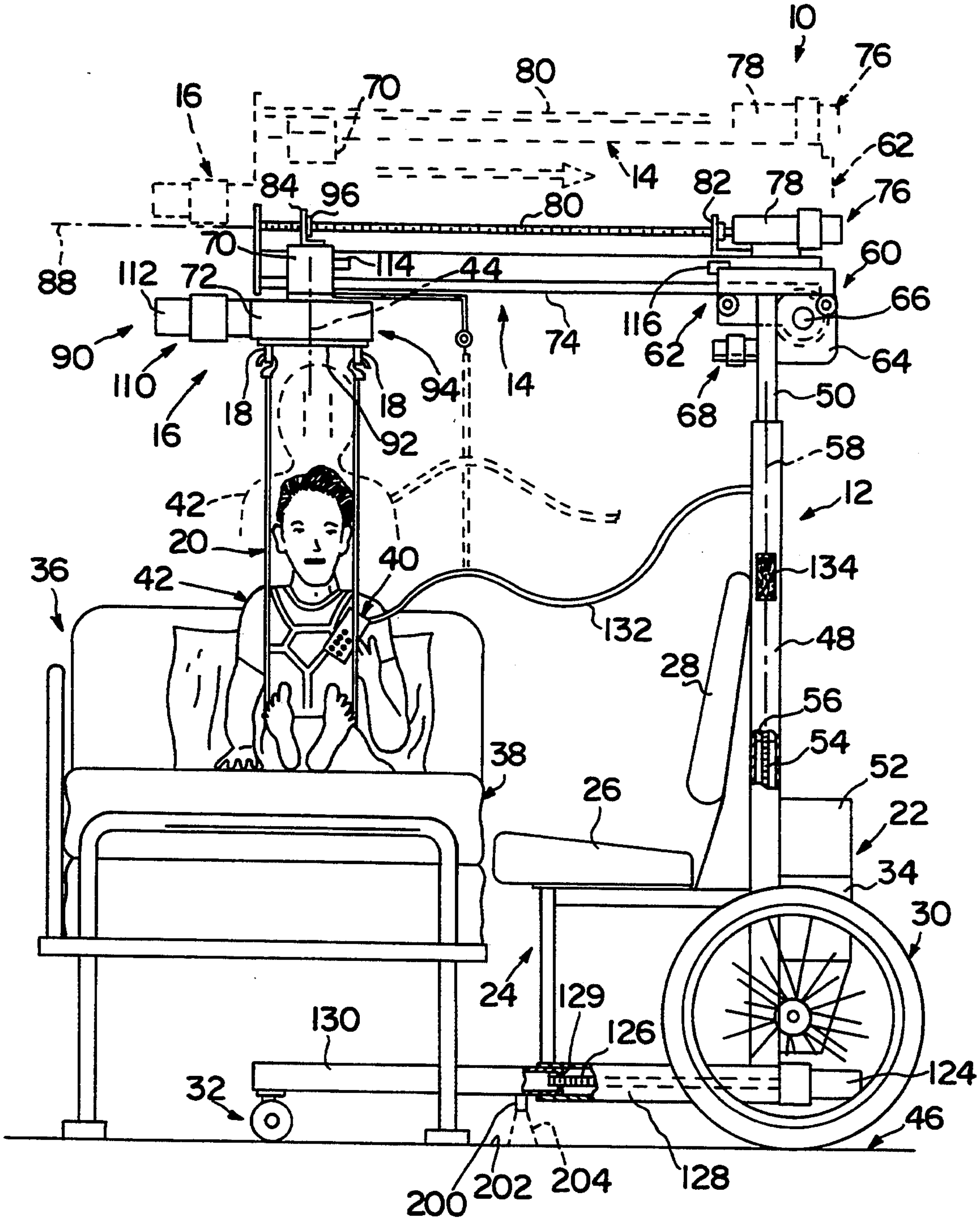
FIG. 1 is a side elevation view of a patient-handling apparatus in accordance with the present invention showing a patient about to be transferred from a bed to a motorized wheelchair carrying the apparatus and facing toward one side of the bed.
Figure 2:
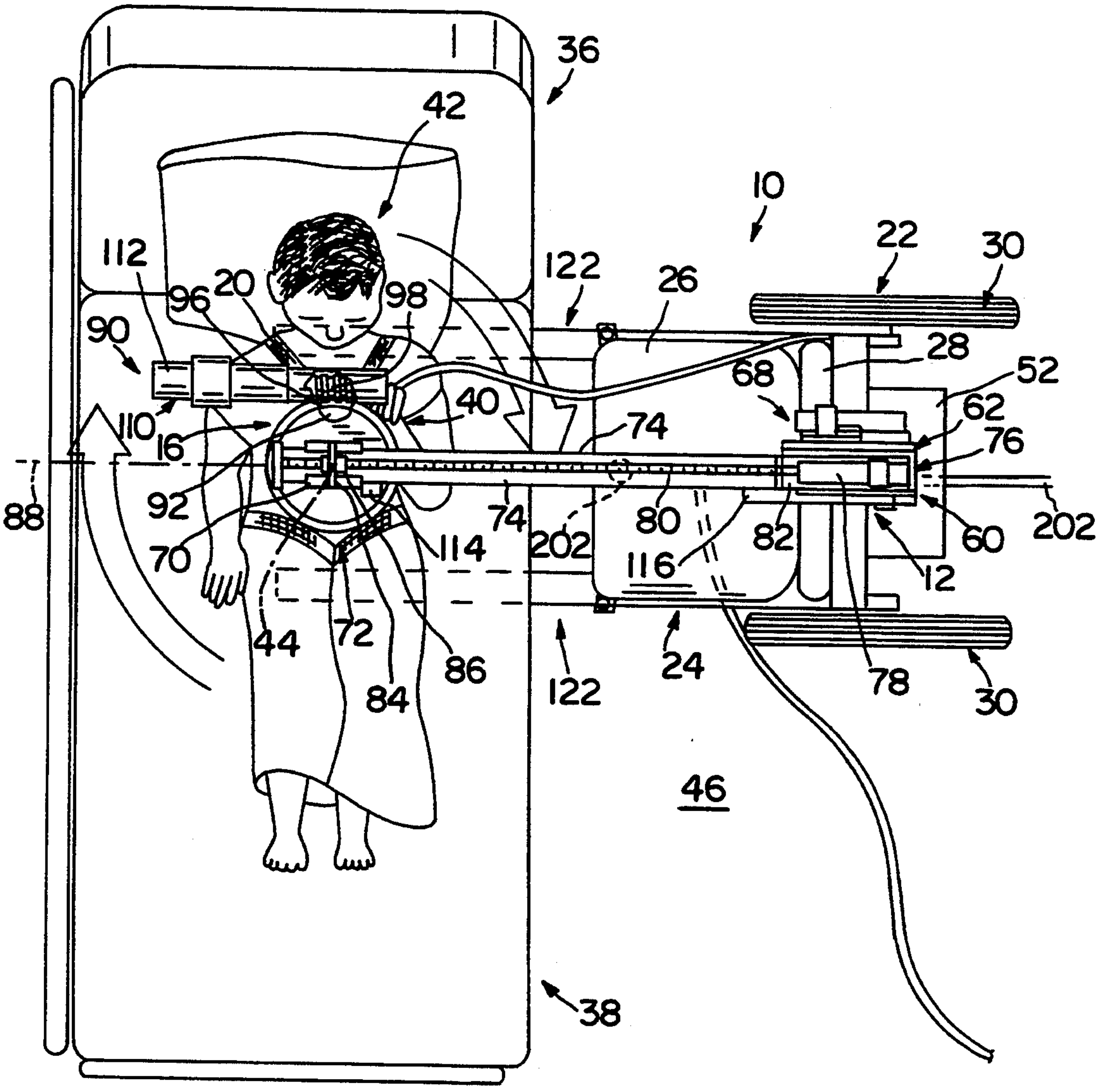
FIG. 2 is a top plan view of the patient-handling apparatus, patient, and bed of FIG. 1.

The patient-handling apparatus 10 shown in FIG. 1 was developed to make it possible for sedentary people to be more mobile and self-sufficient. It is expected that such an apparatus 10 will reduce health care costs in many ways. For example, many disabled people will be able to choose to remain at home rather than transfer to a medical care facility because any one of the patient, a spouse, or an in-the-home caregiver will be able to operate the remote control motorized apparatus 10 easily to move the patient between a wheelchair and a bed, bathtub, couch, or the like without exerting physical effort. In addition, those disabled patients residing in a medical care facility or hospice will be able to take care of themselves, thus freeing up skilled medical caregivers to participate in activities other than lifting, turning, and moving patients. Even if it is determined under the circumstances that the patient should yield and allow a caregiver to operate the apparatus 10, it will be understood that one caregiver in a medical care facility can be assigned to move more patients than heretofore possible by using the motorized apparatus 10, thus reducing the need to assign a large number of skilled medical caregivers to patient-handling duties.

As shown in FIG. 1, the patient-handling apparatus 10 includes an upright post 12, a support arm 14, a patient transport head 16, and one or more hooks 18 on the transport head 16 for attaching a patient-carrying harness or sling 20 to the transport head 16. Illustratively, the upright post 12 is part of a wheelchair 22 to enhance the mobility of the patient-handling apparatus 10. The wheelchair 22 includes a frame 24, seat 26, back 28, large rear wheels 30, small front wheels 32, and wheelchair drive motor 34. As shown in FIG. 1, the patient-handling apparatus 10 is configured to pull up alongside a bed 36 so that the small front wheels 32 extend under the bed 36 and the front edge of seat 26 is adjacent to one side 38 of the bed 36. The apparatus 10 can then be operated using a hand-held remote control unit 40 to transport a patient 42 between the bed 36 and the wheelchair 22.

Essentially, the patient transport head 16 is configured to move along a path on the support arm 14 toward and away from the upright post 12 so as to move a patient 42 back and forth between wheelchair 22 and, for example, bed 36. The patient transport head 16 is also configured to turn a patient 42 suspended from transport head 16 by sling 20 about a vertical axis 44 to facilitate transfer of patient 42 from the forward facing position on bed 36 shown in FIG. 1 to the side facing position on wheelchair 22 shown in FIGS. 3–5. In addition, upright post 12 is configured to raise and lower the support arm 14 relative to the floor 46 as shown in solid and phantom lines in FIGS. 1 and 3 to enable a user to operate apparatus 10 to lift harnessed patients 42 up in the air and then set them down as needed.

Illustratively, upright post 12 is a telescoping assembly including a lower base column 48 mounted on wheelchair 22 and a telescoping upper lift column 50 mounted in the lower base column 48. Means is provided for enabling a user to raise and lower upper lift column 50 in lower base column 48 by remote control between positions shown, for example, in FIGS. 1, 3, 4, and 5. For example, those skilled in the art will understand that a telescoping column motor 52 mounted on wheelchair 22 can be used to turn a vertical power screw 54 (mounted inside lower base column 48) in a drive nut 56 (mounted on upper lift column 50) to advance the drive nut up or down along a longitudinal axis 58 to move the upper lift column 50 relative to the fixed lower base column 48. Of course, other suitable mechanical, electrical, hydraulic, or pneumatic mechanisms can be used to raise and lower upper lift column 50 relative to the fixed lower base column 48.

Figure 4:
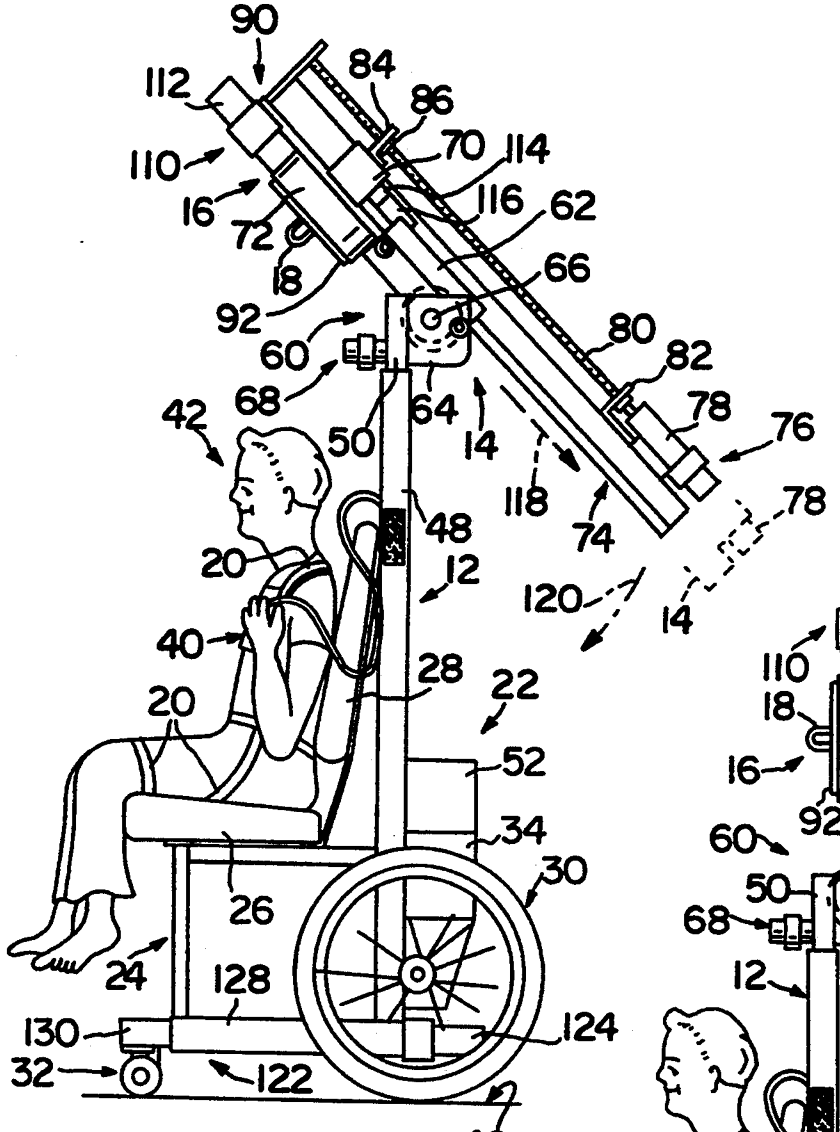
FIG. 4 is a view similar to FIG. 3 showing pivoting movement of the support arm from its cantilevered position and showing a front wheel outrigger assembly in its retracted position.
Figure 5:
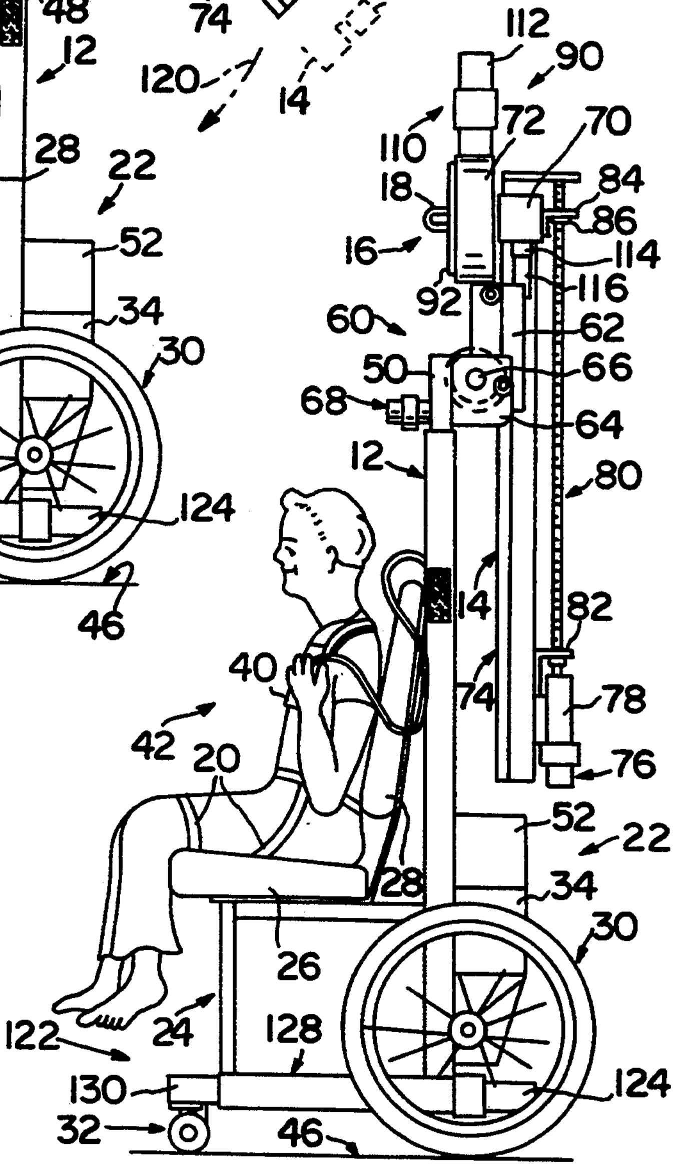
FIG. 5 is a view similar to FIG. 4 showing the now-lowered support arm in its vertical stored position alongside the upright post.

A mechanism 60 for pivoting the support arm 14 from its horizontal cantilevered position shown in FIG. 1 to its vertical stored position shown in FIG. 5. Mechanism 60 includes a pivotable cradle 62, a cradle support 64 mounted on the upper lift column 50, axle means 66 for pivotably coupling the cradle 62 to the cradle support 64, and a cradle motor assembly 68. In use, the cradle motor assembly 68 can be activated using hand-held control unit 40 to pivot the support arm-carrying cradle 62 about pivot axis 66 in either a clockwise or counterclockwise direction to move the support arm 14 between, for example, the positions shown in FIGS. 1, 4, and 5.

Patient transport head 16 includes a trolley 70 and a hollow housing 72 positioned to lie under and connect to the trolley 70. Support arm 14 includes a track system 74 for guiding the trolley 70 along a path on the support arm 14 as the patient transport head 16 is moved toward and away from the upright post 12. This track or guide system 74 allows the trolley 70 to glide on the support arm and thus carry the patient transport head 16 and a patient 42 held in a sling 20 attached to the hooks 18 on transport head 16 from one place to another, as shown, for example, in FIGS. 1 and 3.

A motorized system 76 is provided for moving trolley 70 back and forth along the trolley guide tracks 74 carried on support arm 14. Illustratively, the system 76 includes a drive motor 78 mounted on support arm 14, an elongated power screw 80 extending along and above support arm 14, a first bracket 82 mounted on support arm 14 and located near drive motor 78 for supporting one end of the rotatable power screw 80, and a second bracket 84 mounted on trolley 70 for movement therewith. A drive nut 86 is fixed to the trolley bracket 84 and arranged to engage the power screw 80.

In use, the drive motor 78 can be activated by the hand-held control unit 40 to move the patient 42 along support arm 14. Illustratively, drive motor 76 will operate to turn the power screw 80 about its longitudinal axis 88 in the drive nut 86 to advance the drive nut 86 (and trolley bracket 84 and trolley 70) along a longitudinal axis of the support arm 14 to move the trolley 70 and the patient transport head housing 72 relative to the support arm 14. Thus, the patient transport head 16 is motorized to allow a user to move a patient 42 suspended from the transport head 16 back and forth along the support arm 14.

Figure 3:
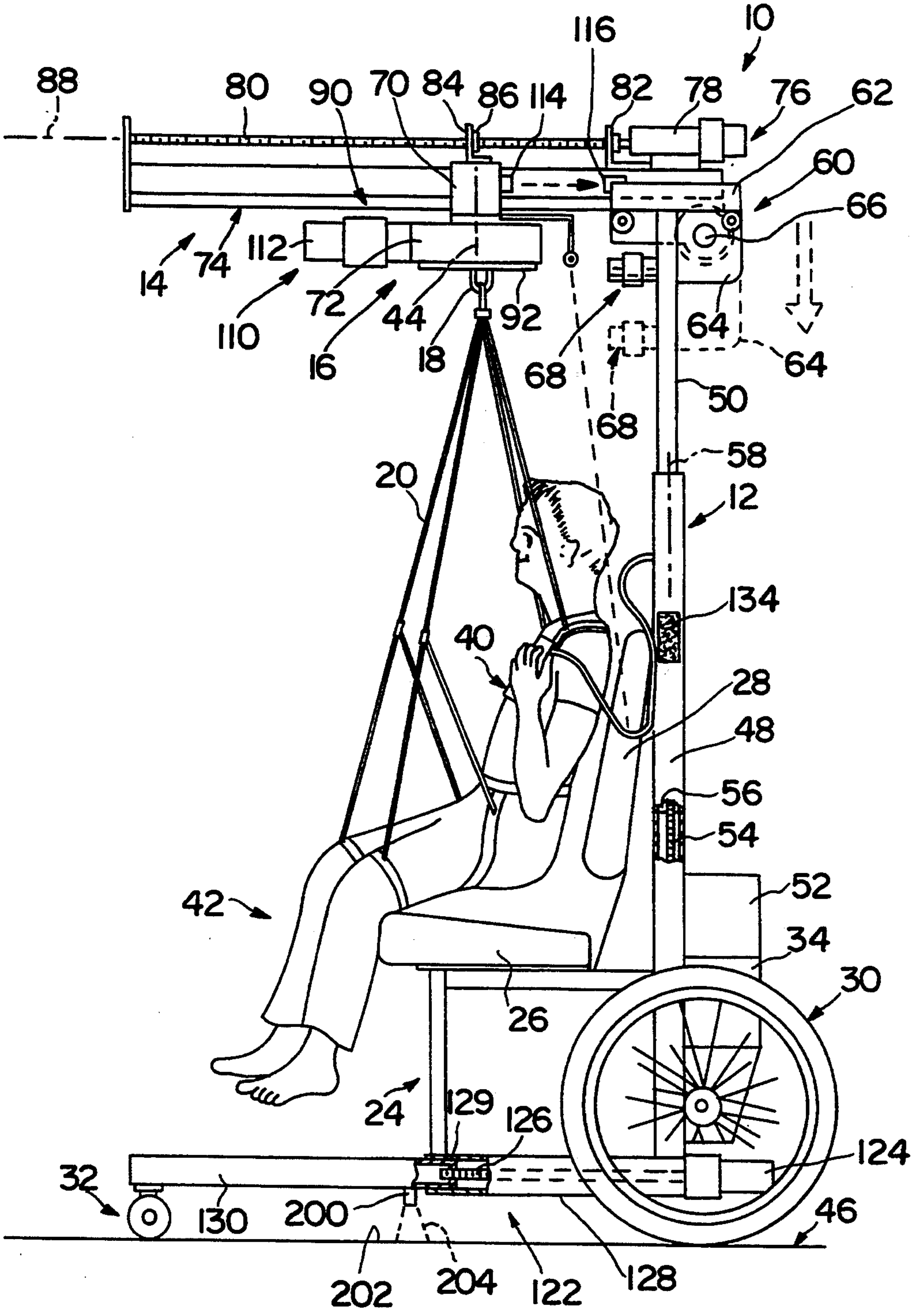
FIG. 3 is a side elevation view similar to FIG. 1 showing the patient being lowered onto the wheelchair seat after the patient was first lifted away from the bed, turned 90° about a vertical axis to cause the patient's back to face toward the wheelchair seat back, and moved using a motorized trolley along a path on the support arm toward the telescoping upright post mounted on the rear of the wheelchair to a position above the wheelchair seat.

Turning of the patient 42 about vertical axis 44 is accomplished using a turning mechanism 90 mounted to transport head housing 72. Illustratively, the turning mechanism 90 includes a turning plate 92 carrying sling-receiving hooks 18, means 94 for supporting the turning plate 92 inside housing 72 for rotation about vertical axis 44, a turning plate worm gear 96, a turning plate worm 98, a turning plate motor 110 for driving worm 98, and a motor housing 112 containing motor 110. The hand-held control unit 40 can be used to activate motor 110 and cause worm 98 to drive worm gear 96 so that the turning plate 92 support for rotation inside housing 72 turns about vertical axis 44. This system enables either patient 42 or a caregiver (not shown) to turn the patient through a 90° angle so that the forward-facing patient shown in FIG. 1 can be turned enough to fit into wheelchair seat 26, 28 as shown in FIGS. 3–5 without requiring physical assistance. The turning plate 92 is able to rotate 360° about vertical axis 44 in a preferred embodiment.

The apparatus 10 also includes a system for using the trolley drive mechanism 76 to move the support arm 14 in cradle 62 as shown in FIG. 4 from a projected position shown in FIG. 1 to a retracted position shown in FIG. 5. Illustratively, as shown in FIG. 1, a trolley anchor means 114 is attached to trolley 70 and oriented to face toward cradle 62. Latch means 116 is attached to cradle 62 to face toward trolley anchor means 114. When mated as shown, for example, in FIG. 4, the trolley anchor means 114 locks to latch means 116 to block relative movement between the trolley 70 and the cradle 62. This locking engagement causes the trolley drive motor 78 to move the support arm 14 relative to the cradle 62 a shown in FIG. 4 rather than move the trolley 70 relative to the support arm 14 as shown in FIG. 3.

Essentially, as shown in FIG. 4, drive motor 78 turns power screw 80 relative to drive nut 86. Because drive nut 86, trolley 70, and cradle 62 are positively fixed to the non-moving upper lift column 50 of upright post 12, relative rotation of power screw 80 and drive nut 86 causes power screw 80 to advance in direction 118 and move support arm 14 relative to cradle 62 in the same direction from the projected position shown in FIG. 1 to the retracted position shown in FIG. 5. As shown in FIG. 4, pivot mechanism 60 is operable to pivot support arm 14 in direction 120 to cause the support arm 14 to move about pivot axis 66 from a horizontal position to a vertical position.

A retractable outrigger assembly 122 is provided on wheelchair 22 to enable a user to move the small front wheels 32 from an extended position shown in FIG. 1 and a retracted position shown in FIG. 4. A motor 124 and power screw 126 can be mounted in a fixed portion 128 attached to wheelchair frame 24 and a drive nut 129 mounted in a movable outrigger portion 130 carrying front wheels 32. Hand-held control unit 40 can be used to activate motor 124 and move wheels 32 between the extended and retracted positions as desired. Provision of an extended position for the outrigger assembly 122 enhances the stability of the patient-handling apparatus 10 and provision of a retracted position enhances the maneuverability of the apparatus 10.

The hand-held control unit 40 is tethered to post 12 by a tether 132 which contains wires (not shown) connected to drive motors 124, 112, 78, 68, 52, and 34. The control unit 40 is configured to allow a user to activate all the motors at selected speeds at selected times to control operation of the apparatus 10. A mounting patch 134 is carried on post 12 to enable a user to attach control unit 40 to post 12 when not in use. Another mounting patch (not shown) can be carried on the patient's sling 20 to enable the patient 42 to carry the control unit 40 in a convenient place.

As shown in FIG. 1, a sensor 200 can be mounted on a bottom portion of apparatus 10 so as to communicate with an underlying vehicle guidance strip 202 by means 204. The vehicle guidance strip 202 is positioned on a floor to define a path that the patient-handling apparatus can follow automatically using the sensor 200 and control means (not shown) for coupling the sensor to the wheel chair motor 34 and control system. By laying out a path in a home or a medical care facility it is possible to program the apparatus to navigate this path and thereby transport a patient according to a predetermined schedule. For example, the path could be set up to move a patient between a bed, eating area, recreation area, bathroom area, and other areas.

Figure 6:
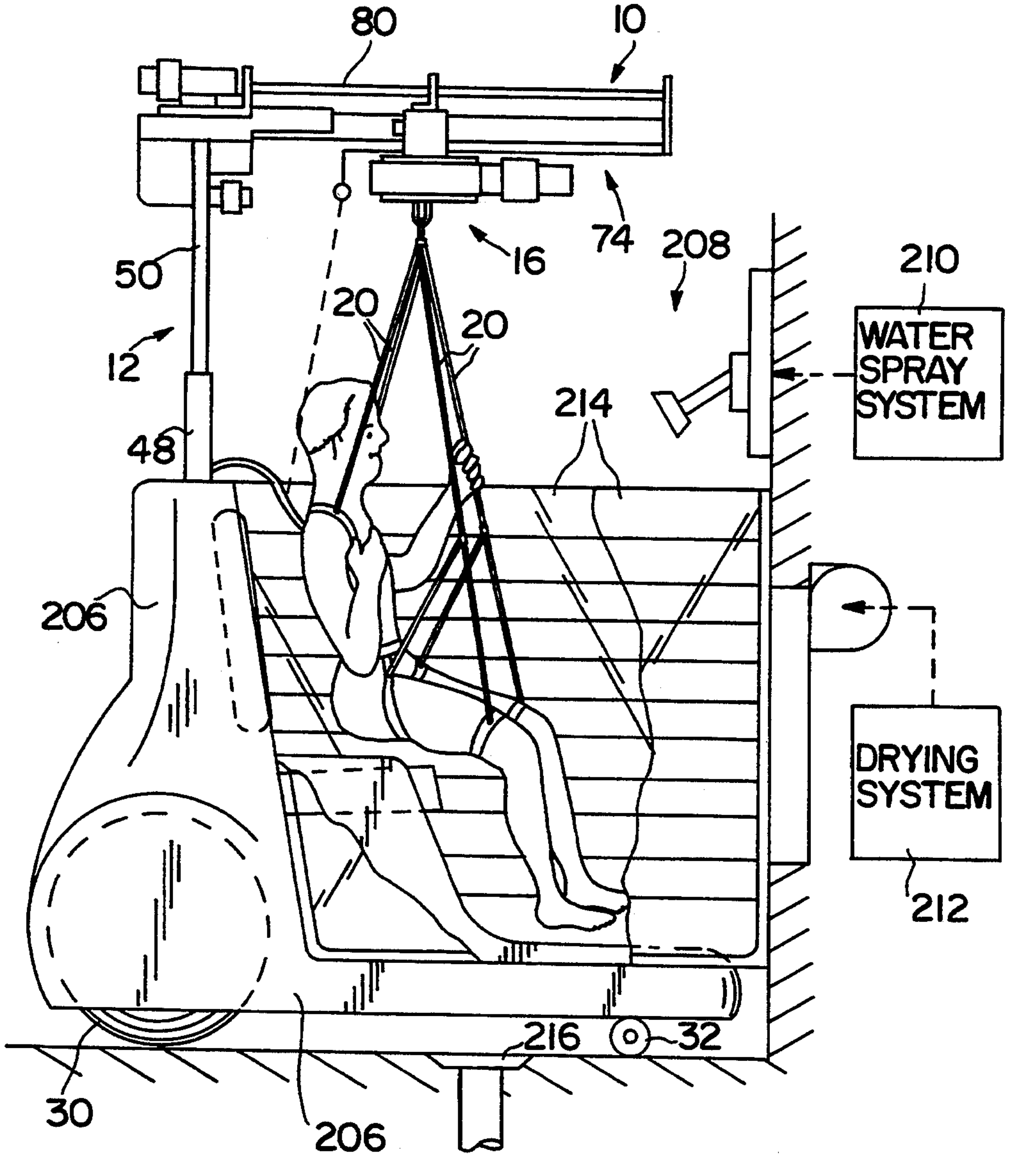
FIG. 6 is a view of a patient-handling apparatus covered by a water-resistant shroud in a shower stall.

As shown in FIG. 6, a rigid plastic shroud 206 can be mounted on apparatus 10 to permit the apparatus 10 to be driven into a shower stall 208 or the like and subjected to water spray provided by water spray system 210 to bathe the patient seated in the apparatus 10. This allows a caregiver to cleanse a soiled patient seated or carried in the apparatus. A patient-drying system 212 can be installed in the shower to aid in drying the patient after showering. The shroud 206 is configured to support side panel "modesty" shields 214 to provide privacy for the patient during a shower and drying sequence. Shower stall 208 is formed to include floor drain 216.

Although the invention has been described in detail with reference to a certain preferred embodiment, variations and modifications exist within the scope and spirit of the invention as described and defined in the following claims.

We claim:

1. A patient-handling apparatus comprising
an upright post having a top end,
a support arm having an inner end adjacent to the upright post and an outer end away from the upright post,
means for coupling the support arm to the top end of the post about a pivot point to permit movement of the support arm relative to the post between a cantilevered position at an angle to the post and a stored position alongside the post and to permit movement of the support arm relative to the pivot point during movement of the support arm between the cantilevered and stored positions,
means for suspending a patient in the air from the support arm following movement of the support arm to its cantilevered position so that a patient can be moved from one place to another along the support arm, and means for moving the patient back and forth along the cantilevered support arm between the inner and outer ends of the support arm.

2. The apparatus of claim 1, wherein the suspending means includes a frame rotatable about a vertical axis, means for attaching a patient-carrying sling to the frame, and means for rotating the frame about its vertical axis so that a patient held in the patient-carrying sling is rotatable about the vertical axis and relative to the support arm from a first position to a second position through an angle of at least 90°.

3. The apparatus of claim 2, wherein the suspending means further includes trolley means for gliding on the support arm and means for coupling the frame to the trolley means to move therewith.

4. The apparatus of claim 3, wherein the suspending means further includes means for moving the trolley means along a path on the support arm when the support arm is in its cantilevered position and during rotation of the frame about its vertical axis.

5. A patient-handling apparatus comprising an upright post, a support arm, means for coupling the support arm to the post to permit movement of the support arm relative to the post about a pivot point between a cantilevered position at an angle to the post and a stored position alongside the post and to permit movement of the support arm relative to the pivot point during movement of the support arm between the cantilevered and stored positions, means for suspending a patient in the air from the support arm following movement of the support arm to its cantilevered position so that a patient can be moved from one place to another along the support arm, and a wheel chair including a chair frame and a seat, the post being appended to the chair frame to move therewith and the support arm being arranged to lie above the seat following movement of the support arm to its cantilevered position.

6. The apparatus of claim 5, wherein the suspending means includes means for holding a patient during movement of the patient from a bed alongside the wheel chair to the seat on the wheel chair and means for moving the holding means along a path on the support arm in its cantilevered position toward and away from the post so that a patient held in the holding means is transportable between the bed and the seat.

7. The apparatus of claim 6, wherein the holding means includes trolley means for gliding on the support arm and means for attaching a patient-carrying sling to the trolley means to move therewith and the moving means includes a drive nut mounted on the trolley means, a power screw mounted on the support arm and arranged to engage the drive nut, and drive motor means for turning the power screw in the drive nut to advance the drive nut along a longitudinal axis of the support arm to move the trolley means relative to the support arm to facilitate transport of a patient held in the patient-carrying sling between a bed and the wheelchair.

8. The apparatus of claim 6, wherein the holding means includes a trolley and means for attaching a patient-carrying sling to the trolley and the support arm includes track means for guiding the trolley along its path on the support arm to facilitate transport of a patient held in the patient-carrying sling between a bed and the wheelchair.

9. The apparatus of claim 6, wherein the holding means includes trolley means for gliding on the support arm, a rotatable frame, means for attaching a patient-carrying sling to the frame, and means for rotatably mounting the frame to the trolley means to move along the support arm with the trolley means and rotate relative to the trolley means about a vertical axis so that a patient-carrying sling attached to the rotatable frame and a patient held in the patient-carrying sling rotate about the vertical axis with the rotatable frame to turn the patient relative to the seat of the wheel chair so as to facilitate transport of the patient to the seat of the wheel chair by enabling a patient situated on the bed and oriented to face in a first direction to be turned and reoriented to face in a second direction prior to reaching the seat.

10. A patient-handling apparatus comprising an upright post, a support arm, means for coupling the support arm to the post to permit movement of the support arm relative to the post about a pivot point between a cantilevered position at an angle to the post and a stored position alongside the post and to permit movement of the support arm relative to the pivot point during movement of the support arm between the cantilevered and stored positions, and means for suspending a patient in the air from the support arm following movement of the support arm to its cantilevered position so that a patient can be moved from one place to another, the suspending means including means for holding a patient during movement of the patient relative to the post and means for moving the holding means along a path on the support arm toward and away from the post while the support arm is fixed in its cantilevered position.

11. The apparatus of claim 10, wherein the holding means includes trolley means for gliding on the support arm and means for attaching a patient-carrying sling to the trolley means to move therewith and the moving means includes a drive nut mounted on the trolley means, a power screw mounted on the support arm and arranged to engage the drive nut, and drive motor means for turning the power screw in the drive nut to advance the drive nut along a longitudinal axis of the support arm to move the trolley means relative to the support arm.

12. The apparatus of claim 11, further comprising means for turning the holding means about a vertical axis to change the angular orientation of a patient held in the holding means in a suspended position relative to the post and wherein the attaching means includes a housing attached to the trolley means, a turning plate, means for mounting the turning plate in the housing for rotation about a vertical axis, and means for fastening the patient-carrying sling to the turning plate, and the turning means includes means for rotating the turning plate about its vertical axis so that a patient held in the patient-carrying sling rotates about the vertical axis with the turning plate.

13. The apparatus of claim 10, wherein the holding means includes a trolley and means for attaching a patient-carrying sling to the trolley and the support arm includes track means for guiding the trolley along its path on the support arm.

14. The apparatus of claim 10, wherein the holding means includes trolley means for gliding on the support arm, a rotatable frame, means for attaching a patient-carrying sling to the frame, means for rotatably mounting the frame to the trolley means to move along the support arm with the trolley means and rotate relative to the trolley means about a vertical axis so that a patient-carrying sling attached to the rotatable frame and a patient held in the patient-carrying sling rotate about the vertical axis.

15. The apparatus of claim 10, further comprising means for turning the holding means about a vertical axis to change the angular orientation of a patient held in the holding means in a suspended position relative to the post and wherein the moving means includes a first drive motor mounted on the support arm and first power means for propelling the holding means along its path in response to operation of the first drive motor and the turning means includes a separate second drive motor.

16. The apparatus of claim 15, wherein the holding means includes a trolley, means for gliding on the support arm, a rotatable frame, and means for attaching a patient-carrying sling to the frame, the second drive motor is mounted on the trolley means, and the turning means further includes second power means for using the second drive motor to rotate the rotatable frame relative to the trolley means about the vertical axis.

17. The apparatus of claim 16, wherein the coupling means include a cradle, channel means for receiving the support arm, means for mounting the cradle to the post for pivotable movement between a horizontal position oriented to maintain the support arm in its horizontal cantilevered position and a vertical position oriented to allow movement of the support arm in the channel means to a stored position alongside the post, a third drive motor mounted on the post, and third power means for using the third drive motor to pivot the cradle and the support arm received in the channel means formed in the cradle so that the support arm is moved by the cradle relative to the pivot point and between its horizontal cantilevered position and its stored position alongside the post.

18. The apparatus of claim 10, further comprising means for turning the holding means about a vertical axis to change the angular orientation of a patient held in the holding means in a suspended position relative to the post and wherein the holding means includes a trolley and means for attaching a patient-carrying sling to the trolley and the support arm includes track means for guiding the trolley along its path on the support arm.

19. The apparatus of claim 18, wherein the attaching means includes a housing attached to the trolley, a turning plate, means for mounting the turning plate in the housing for rotation about the vertical axis, and means for fastening the patient-carrying sling to the turning plate, and the turning means includes means for rotating the turning plate about the vertical axis so that a patient held in the patient-carrying sling rotates about the vertical axis with the turning plate.

20. The apparatus of claim 10, further comprising means for turning the holding means about a vertical axis to change the angular orientation of a patient held in the holding means in a suspended position relative to the post and wherein the holding means includes trolley means for gliding on the support arm, a rotatable frame, means for attaching a patient-carrying sling to the frame, and means for rotatably mounting the fame to the trolley means to move along the support arm with the trolley means and rotate relative to the trolley means about the vertical axis so that the patient-carrying sling attached to the rotatable frame and a patient held in the patient-carrying sling rotate about the vertical axis and the turning means includes means for rotating the frame about its vertical axis.

21. The apparatus of claim 20, wherein the rotating means includes a worm gear connected to the frame, a worm engaging the worm gear, and drive motor means for turning the worm to rotate the worm gear and the frame connected to the worm gear.

22. A patient-handling apparatus comprising
an upright post,
a support arm,
means for coupling the support arm to the post to permit movement of the support arm relative to the post between a cantilevered position at an angle to the post and a stored position alongside the post,
means for suspending a patient in the air from the support arm following movement of the support arm to its cantilevered position so that a patient can be moved from one place to another, and the coupling means including a cradle, guide means in the cradle for guiding the support arm to permit reciprocating movement of the support arm in the cradle between an extended position and a retracted position, and means for pivotably connecting the cradle to the post to permit movement of the cradle between a horizontal position oriented to maintain the support arm in its cantilevered position at an angle to the post and a vertical position oriented to allow movement of the support arm to its stored position alongside the post.

23. The apparatus of claim 22, wherein the coupling means further includes means for pivoting the cradle between its horizontal and vertical positions.

24. The apparatus of claim 23, further comprising means for reciprocating the support arm in the guide means between its extended and retracted positions upon pivoting movement of the cradle to its vertical position so that the support arm can be moved relative to the post automatically to its stored position alongside the post once the cradle is in its vertical position.

25. A patient-handling apparatus comprising
an upright post,
a support arm,
means for coupling the support arm to the post to permit movement of the support arm relative to the post about a pivot point between a cantilevered position at an angle to the post and a stored position alongside the post and to permit movement of the support arm relative to the pivot point during movement of the support arm between the cantilevered and stored positions, and
means for suspending a patient in the air from the support arm following movement of the support arm to its cantilevered position so that a patient can be moved from one place to another, the coupling means including means for pivoting the support arm relative to the post about the pivot point between its cantilevered position and its stored position and control means for operating the pivoting means by remote control.

26. The apparatus of claim 25, wherein the coupling means further includes a cradle connected to the support arm and pivotably mounted on the post and the control means includes a first drive motor mounted on the post and connected to the cradle.

27. The apparatus of claim 26, wherein the suspending means includes means for holding a patient and means for moving the holding means along a path on the support arm toward and away from the post while the support arm is in its cantilevered position and the moving means includes a second drive motor mounted on the support arm and connected to the holding means.

28. A patient-handling apparatus comprising an upright telescoping post assembly including a foundation, a lower base column mounted on the foundation, and an extensible upper lift column, means for raising and lowering the upper lift column relative to the lower base column, a support arm, means for coupling the support arm to the upper lift column to permit movement of the support arm about a pivot point between a cantilevered position at an angle to the upper lift column and a stored position alongside the lower base column and the upper lift column and to permit movement of the support arm relative to the pivot point during movement of the support arm between the cantilevered and stored positions, and means for suspending a patient in the air from the support arm following movement of the support arm to its cantilevered position, the suspending means including a trolley, track means for guiding the trolley along its path on the support arm, a housing arranged to underlie the trolley and connected to the trolley for movement with the trolley, means for moving the trolley back and forth along the cantilevered support arm so that the housing is moved toward and away from the upper lift column, a turning plate, means for mounting the turning plate in the housing for rotation about a vertical axis, means for fastening a patient-carrying sling to the turning plate to carry a patient under the turning plate, and means for rotating the turning plate about its vertical axis so that a patient held in the patient-carrying sling rotates about the vertical axis with the turning plate.

* * * * *